Figure 1:
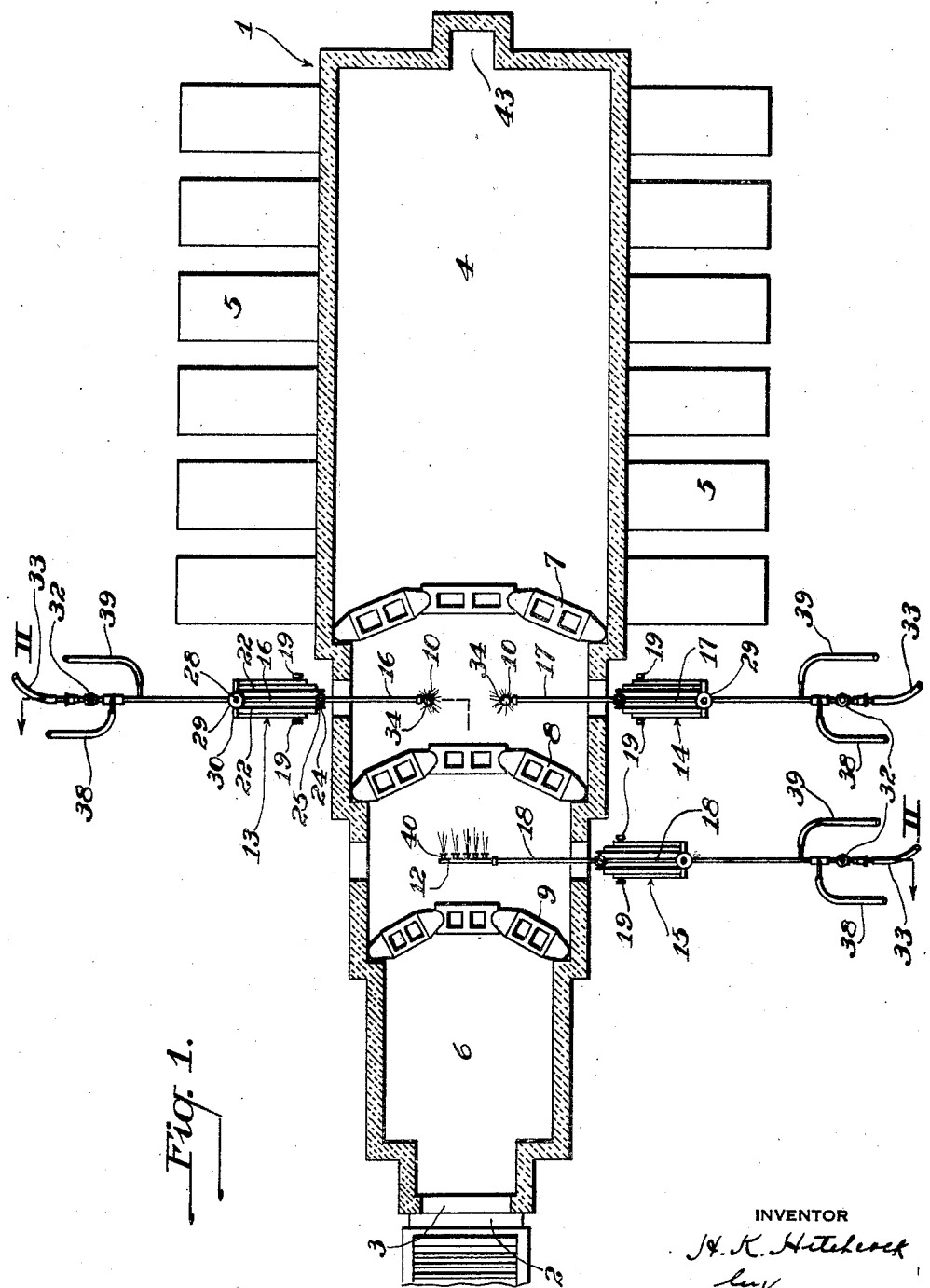

June 7, 1927.

H. K. HITCHCOCK 1,631,204

PROCESS AND APPARATUS FOR MELTING GLASS

Filed Oct. 16, 1926

4 Sheets-Sheet 1

INVENTOR
H. K. Hitchcock
by
James E. Bradley
Atty.

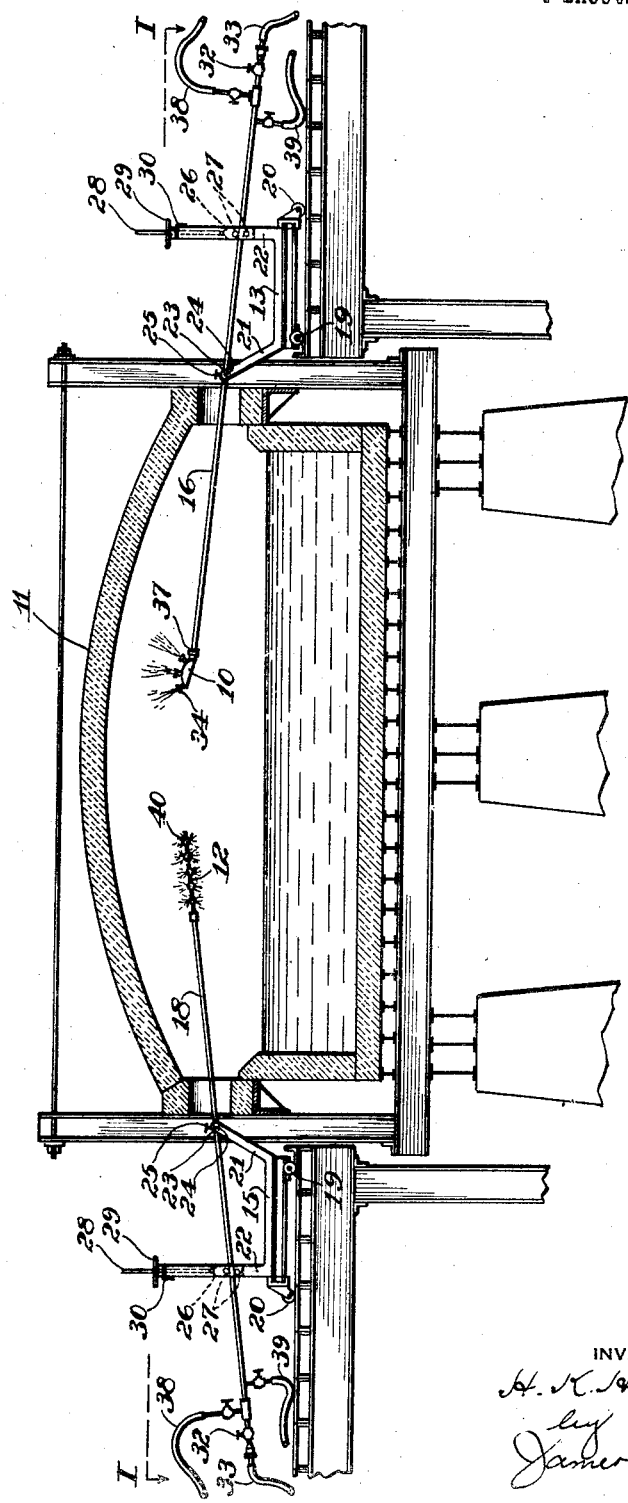

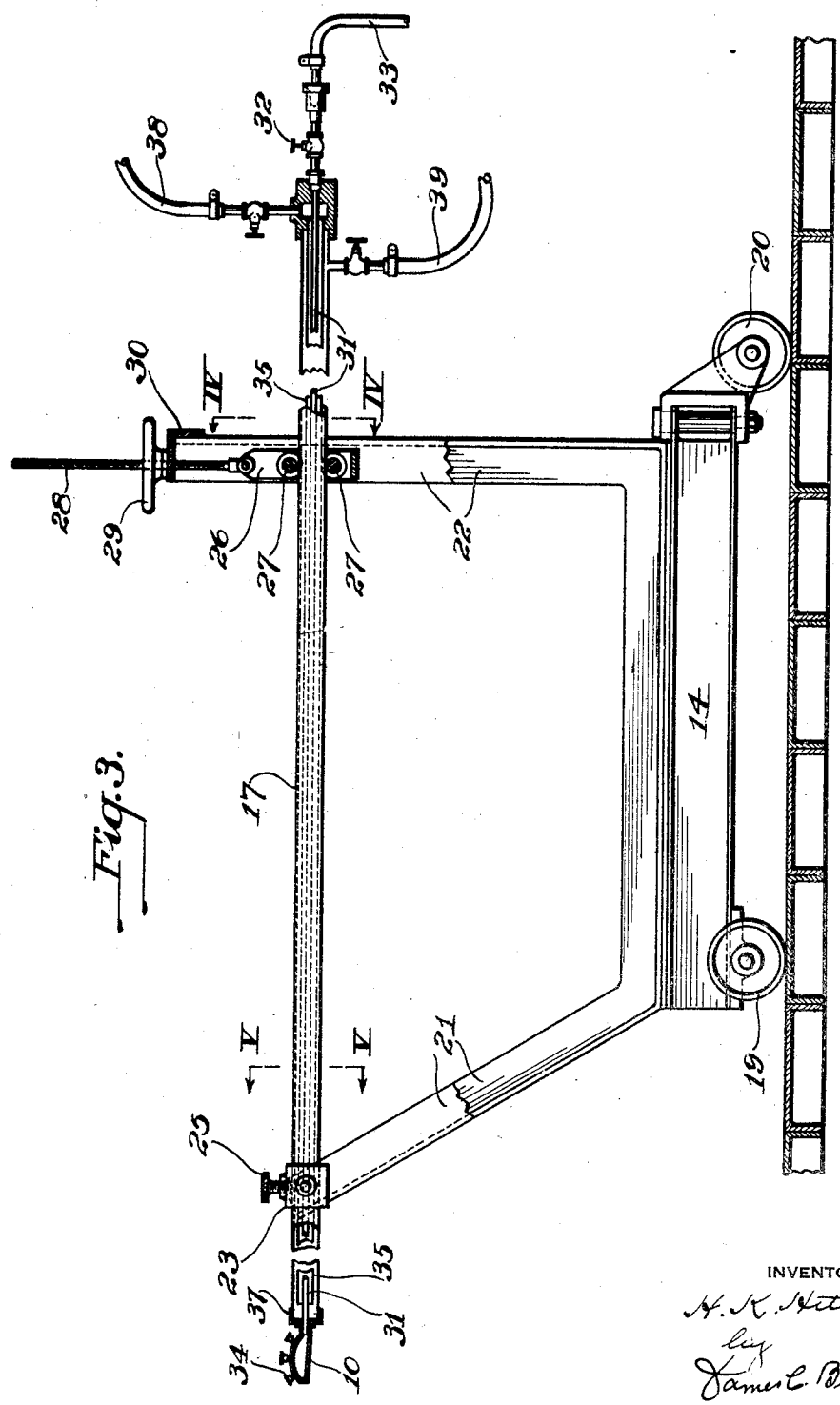

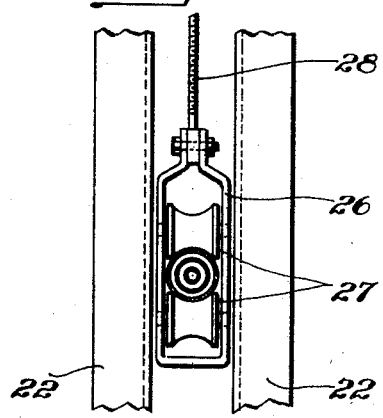
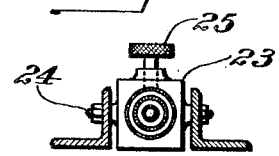
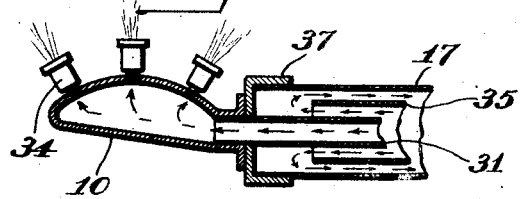
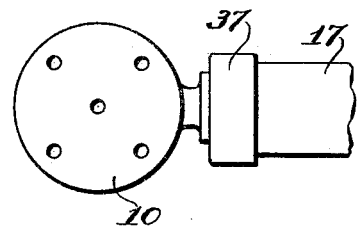
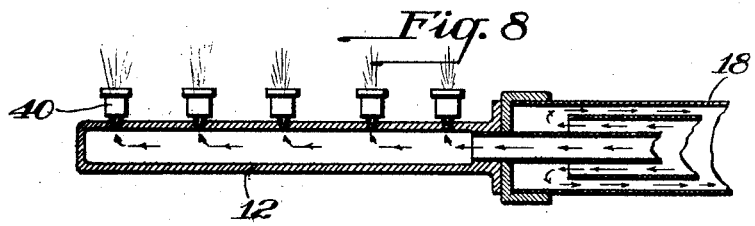
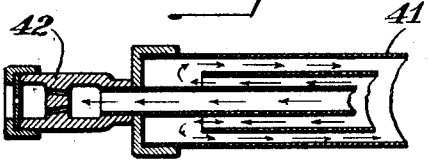

Patented June 7, 1927.

1,631,204

UNITED STATES PATENT OFFICE.

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA.

PROCESS AND APPARATUS FOR MELTING GLASS.

Application filed October 16, 1926. Serial No. 141,947.

The invention relates to a process and apparatus for melting glass. It has for its principal objects the provision of a process and apparatus, (1) whereby the capacity of a glass tank, both in melting and fining may be greatly increased at small additional cost and with very simple equipment; (2) whereby the relative temperatures in different parts of the tank may be controlled and a greater difference in temperature between the melting and delivery ends maintained than has heretofore been possible in the ordinary tank operation; (3) whereby the glass in the tank in advance of the melting zone of the tank may be chilled to any desired extent so as to check the secondary reaction, which occurs in glass, in case the melting temperature is continued for too long a time after the primary boiling action is completed, such secondary reaction serving to produce very fine bubbles or seed which can never be eliminated from the product and which materially reduce its value; (4) whereby a more uniform temperature may be maintained in the delivery end of the tank from one side thereof to the other; and (5) whereby a product is secured at the delivery end of the tank, which closely approximates in quality that produced by the more expensive operation of melting in pots.

The invention is illustrated as applied to a tank arranged to deliver glass continuously from its forward end in the so-called continuous rolling process of producing rough plate glass, but the invention is of value with tanks having any method of delivery, such as those for making window glass, in which the glass may be dipped or drawn in a continuous sheet from the delivery end.

Briefly stated, the invention involves the use of water vapor cooling means in the tank intermediate the melting zone and the delivery zone. The cooling liquid to accomplish the desired result is supplied by atomizing, or spraying, the water into the space between the glass bath and the arch of the furnace, the finely divided liquid being preferably directed upward and laterally rather than downward, so that the arch is cooled and a blanket of cooling vapor provided between the bath and arch without applying the water to the surface of the glass itself. Water vapor, so applied, has a powerful cooling effect in the zone in which it is applied, even when used in relatively small quantities, due to the latent heat of evaporation of the water, and this causes a marked reduction in temperature in the arch above the glass from which the glass is largely heated by reflection, and in the body of molten glass immediately beneath the vaporizing apparatus. This reduction in temperature of the glass in the area or zone beneath the spraying apparatus corresponds to the cooling action as applied in the pot process after the glass has been melted and the primary boiling or reducing action has been completed. At such time, the temperature in the pot furnace is reduced as rapidly as possible to the casting temperature and the glass allowed to "soak" for several hours, thus preventing a secondary boiling action (which would produce a new batch of very fine bubbles impossible of removal) and giving time for the escape of the major portion of the larger bubbles produced in the primary reaction, and for the glass to reach a homogeneous temperature.

Any secondary reaction in the tank is, therefore, checked, and a period provided between the cooling zone and the delivery point of the tank in which the glass may be kept at a temperature approximating the so-called soaking temperature at which the glass is held in the pot process. The process thus permits an approximation of pot conditions, and makes it possible to run the melting end of the tank at a temperature as high as may be necessary to properly melt the glass, without raising the temperature of the glass in the delivery end above the point (much below that in the melting end) best suited for rolling or drawing. This control of temperature is further promoted by the body of gas formed from the vaporized water which more or less separates or insulates the bodies of gases in the two ends of the tank from each other, so that the temperature in the tank above the bath in the melting end may be maintained far above that in the delivery or soaking end.

This procedure permits the melting end of the tank to be run at a much higher temperature than is ordinarily done in a tank furnace without causing an increase in temperature in the other end to a point unsuitable for rolling, so that the capacity of the tank is materially increased. The delivery section of the tank is correspondingly increased in capacity since the cooling feature permits of the passage of a greater quantity of glass through the end without causing a rise in temperature above the point at which it can be used to the best advantage. It also follows from this that a tank can be used having a less width than is ordinarily permissible, thus reducing the tendency to the formation of devitrified glass along the sides of the tank due to lack of movement at such points.

The glass in the delivery end of the tank is further more uniform in temperature under the conditions of the process here employed, as a greater cooling effect can be applied at the center by having the vaporizing devices adjacent the center of the tank where the glass is normally higher in temperature than at the sides where the heat losses incident to conduction through the tank walls are larger. Certain embodiments of the invention are illustrated in the accompanying drawings, wherein:

Figure 1 is a horizontal section on the line I—I of Fig. 2. Fig. 2 is a section on the line II—II of Fig. 1. Fig. 3 is a side elevation on an enlarged scale of one of the spraying devices. Fig. 4 is a section on the line IV—IV of Fig. 3. Fig. 5 is a section on the line V—V of Fig. 3. Figs. 6 and 7 are detail views of one of the spray heads on a still larger scale than that of Fig. 3, Fig. 6 being a plan view and Fig. 7 a vertical section. Fig. 8 is an enlarged horizontal section through the forward spray head, shown in Fig. 1. And Fig. 9 is a section through still another form of spray head.

Referring to the general arrangement as shown in Fig. 1, 1 is a glass melting tank provided at its forward end with a pair of driven rollers 2, between which glass may be delivered continuously through the horizontal slot 3, this method of forming a glass sheet continuously being well known in the art and being shown in the patent to Gelstharp No. 1,560,079. The tank is preferably of the regenerator type having the melting end 4 lying between the gas and air passages 5 leading from the regenerators and having a delivery end 6 at the other end of the tank. The section of the tank lying between the sections 4 and 6 constitutes the part to which cooling means are applied as hereinafter set forth and may be referred to as the cooling section. Three sets of floaters 7, 8 and 9 are preferably employed for retarding the movement of the surface glass through the tank and preventing impurities which collect at the surface of the glass from being carried along to the delivery end of the tank. As shown in Figs. 1 and 2, the tank is of ordinary construction except that the forward half of the tank is reduced in width in three steps, as indicated in Fig. 1, the customary construction being one in which the tank is of uniform width from one end to the other. The purpose of this modification is to reduce the amount of glass at the sides of the tank which is more or less stagnant and tends to prevent the formation of devitrified glass as heretofore commented on. The cooling feature of the present process makes this reduction in width of the furnace feasible, as the cooling surface required is not so great because of the artificial cooling produced by the vaporizing devices upon the stream of glass before it reaches the end of the tank.

The number of vaporizing or spraying devices for securing the desired cooling effect may be varied to suit conditions and their location may be varied through a considerable range, but preferably there are three of these spraying devices arranged, as indicated in Figs. 1 and 2. The two heads 10, 10 are of circular form arranged opposite each other and directed upwardly toward the crown or arch 11 of the furnace, while the head 12 which is arranged further forward in the tank is directed to the rear. The spraying devices are mounted upon trucks 13, 14, and 15 and carry the pipes 16, 17 and 18, through which the water is supplied, the construction of the trucks and the pipes carrying the various heads being the same so that a description of one will be sufficient for all.

Referring to Figs. 3, 4 and 5, the truck 14 is provided with a pair of front wheels 19 and a single swiveled rear wheel 20, which permits the ready turning of the apparatus so that the pipe 17 lies at any desired angle. The pipe 16 may also be tilted in a vertical direction and moved endwise in the supporting frame members 21 and 22. A block 23 is carried between the members 21 (Fig. 5) and is supported for tilting movement by the trunnions 24. The pipe 17 is slidable through the block and may be clamped in position by means of the lock screw 25. The rear end of the pipe 17 is carried in a yoke 26 (Fig. 4) being supported between the rollers 27 pivoted in such yoke. The yoke is in turn carried by the screw 28 which may be adjusted up and down by the hand wheel 29 swiveled in a transverse angle 30 connecting the upper ends of the frame members 22. This arrangement permits the spray head 10 to be shifted in and out toward the center of the tank or moved vertically or longitudinally of the tank. Water is supplied to the spray head 10 through the center pipe 31 having a regulating valve 32 at its rear end which is connected to the flexible pipe 33. The spray tips 34 are screwed into the head 10 and may be of any suitable construction for causing the water passing therethrough to be finally sub-divided and spread out in a fine spray. The heads and sprays are preferably so constructed that the water is spread out and vaporized before it strikes the arch 11 of the furnace, thus reducing the danger of injury to the brick due to too sudden chilling. Provision is also made for keeping the pipe 17 cool by circulating a stream of water therethrough continuously. This is accomplished by the use of a third pipe 35 (Fig. 7) which terminates short of the cap 37 and is supplied with water at its rear end from the flexible pipe 38. The return water which flows to the rear end of the pipes through the space between the pipe 35 and the pipe 17 is conducted to the flexible outlet pipe 39 at the rear end of the pipe 17. This arrangement guards the pipe against danger of being burned out by the heat of the tank to which it is exposed.

The forward spray head 12 is provided with the series of tips 40 which are arranged in series along the head and directed to the rear, as indicated in Fig. 1.

Still another form of spray head is shown in Fig. 9, wherein the pipe 41 is provided with only a single atomizing or spraying tip 42. The invention obviously contemplates any suitable spraying means which will accomplish the function of dividing the water into fine spray or vapor.

In operation, the glass batch which is to be converted into the finished product is fed into the rear end of the tank at 43 and is reduced to a molten bath in the melting end 4, the glass here going through the usual melting and boiling action the same as in any glass melting tank. The body of glass as thus melted moves slowly forward through the tank, past the first set of floaters 7, at which point its temperature is materially reduced by the use of the spray heads 10, 10. The amount of this temperature reduction depends upon the amount of water which is forced through the spray heads. A substantial drop in temperature, however, is produced at this point in the glass bath beneath the spray devices so that any secondary boiling action in the glass, as heretofore referred to, is avoided, the glass being chilled to a point where there will be no further reaction of this character. From this point, the glass moves slowly forward to the delivery end 6 of the tank, the period of time required being such that a thorough "soaking" action is secured, corresponding to the similar action in a pot process and the glass is then delivered through the slot 3 at a temperature suitable for rolling. The temperature of the glass in the delivery end 6 is easily regulated by the amount of cooling action developed from the spray heads 10, 10 and 12. The arrangement thus permits the melting end 4 of the tank to be carried at as high a temperature as may be desired without causing a corresponding increase in the delivery end 6, such as would render the glass too hot for rolling at the desired speed. The capacity of the tank may thus be forced considerably above the normal capacity of a tank of similar size but lacking vaporizing devices. The body of vapor from the spraying devices lying between the molten bath and the arch 11 of the tank acts as a separating means or insulator, so that the body of gas above the delivery end 6 is relieved to a certain extent from the heating effect of the hot gases above the bath in the melting end 4 of the tank. The application of the vaporizing devices adjacent the center line of the furnace performs a further function of equalizing the temperature of the glass in the tank from one side to the other, since the glass is normally hotter at the center of the tank so that the chilling at this point equalizes the condition. The chilling effect upon the gases in the furnace adjacent the center also tends to cause such gases to flow outward toward the sides of the tank, thus tending to withdraw heat from the center and apply it to the sides. The difference in temperature between the sides and center of the tank is in this manner reduced to a minimum and the product drawn from the tank is correspondingly more uniform in quality from one side of the sheet produced to the other.

What I claim is:

1. In a glass melting tank, having a top wall or arch, a melting end, a delivery end remote therefrom, a cooling section intermediate said ends, means for applying heat to said melting end to reduce the batch supplied thereto, and means for spraying a cooling fluid into the space between the glass bath and the arch in said cooling section.

2. In a glass melting tank, having a top wall or arch, a melting end, a delivery end remote therefrom, a cooling section intermediate said ends, means for applying heat to said melting end to reduce the batch supplied thereto, and means for supplying a finely divided liquid into the space between the glass bath and the arch of the cooling section.

3. In a glass melting tank, having a top wall or arch, a melting end, a delivery end remote therefrom, a cooling section intermediate said ends, means for applying heat to said melting end to reduce the batch supplied thereto, and means for directing a finely divided liquid upwardly into the space between the glass bath and the arch of the cooling section.

4. A process of melting glass in a melting tank, which consists in supplying batch to one end of the tank, applying heat to melt the batch in such end, withdrawing molten glass from the other end of the tank to cause a flow through the tank to such end, supplying a water spray to the interior of the tank intermediate its ends to materially reduce the temperature of the glass at such point, and maintaining the glass in the delivery end of the tank at a temperature below that in said melting end.

5. A process of melting glass in a melting tank, which consists in supplying batch to one end of the tank, applying heat to melt the batch in such end, withdrawing molten glass from the other end of the tank to cause a flow through the tank to such end, supplying a water spray to the interior of the tank intermediate its ends to materially reduce the temperature of the glass at such point, and maintaining the glass in the delivery end of the tank at a temperature not higher than that to which the glass is reduced by said water vapor.

6. A process of melting glass in a melting tank, which consists in supplying batch to one end of the tank, applying heat to melt the batch in such end, withdrawing molten glass from the other end of the tank to cause a flow through the tank to such end, spraying water into the tank intermediate its ends and thus causing a reduction in the temperature of the glass, such as to prevent a secondary reaction therein, and maintaining the glass at such reduced temperature until it reaches the delivery end of the tank.

7. A process of melting glass in a melting tank, which consists in supplying batch to one end of the tank, applying heat to melt the batch in such end, withdrawing molten glass from the other end of the tank to cause a flow through the tank to such end, spraying water upwardly into the tank toward the arch thereof at a point remote from its delivery end, to cause a reduction in temperature of the glass to a point substantially below that in the melting end, and maintaining the glass at its reduced temperature as it flows onward to its point of delivery from the tank.

8. A process of melting glass in a melting tank, which consists in supplying batch to one end of the tank, applying heat to melt the batch in such end, withdrawing molten glass from the other end of the tank to cause a flow through the tank to such end, spraying water into the tank intermediate its ends and adjacent the center thereof so as to produce a greater cooling effect on the central portion of the body of glass than on the side portions, and maintaining the glass at its reduced temperature as it flows onward to its point of delivery from the tank.

9. A process of making a continuous glass sheet which consists in applying heat to a body of glass batch to melt the batch and cause it to boil, causing the molten glass thus produced to flow forwardly, applying water vapor above the stream of glass to check further reaction therein and materially reduce its temperature, causing the glass to flow forwardly beyond the point of cooling a substantial distance without increasing its temperature further, and finally forming it continuously into a glass sheet.

In testimony whereof, I have hereunto subscribed my name this 13th day of Oct., 1926.

HALBERT K. HITCHCOCK.